United States Patent [19]

Somers et al.

[11] 4,374,184
[45] Feb. 15, 1983

[54] FUEL CELL GENERATOR AND METHOD OF OPERATING SAME

[75] Inventors: Edward V. Somers, Murrysville; Arnold O. Isenberg, Pittsburgh, both of Pa.

[73] Assignee: Westinghouse Electric Corp., Pittsburgh, Pa.

[21] Appl. No.: 306,810

[22] Filed: Sep. 29, 1981

[51] Int. Cl.³ ............................................. H01M 8/06
[52] U.S. Cl. ........................................ 429/17; 429/31
[58] Field of Search ...................... 429/17, 30, 31, 33

[56] References Cited

U.S. PATENT DOCUMENTS 3,228,797 1/1966 Brown et al. ......................... 429/31
3,462,306 10/1965 Schneider ............................. 136/86
4,200,682 4/1980 Sederquist ............................. 429/17
4,204,033 5/1980 Meissner ............................... 429/33
4,331,742 5/1982 Richter ................................. 429/33

OTHER PUBLICATIONS

Noyes, Fuel Cell for Public Utility and Industrial Power, Noyes Data Corp., Park Ridge, N.J., 1977, pp. 12–13.

Primary Examiner—Donald L. Walton
Attorney, Agent, or Firm—W. E. Otto

[57] ABSTRACT

Solid oxide electrolyte fuel cell generators which are operable to reform in-situ a gaseous medium and to utilize the products of the reformation as fuel. A portion of the reformation preferably occurs along an electrochemically inactive extension of each fuel cell.

16 Claims, 6 Drawing Figures

FUEL CELL GENERATOR AND METHOD OF OPERATING SAME

GOVERNMENT CONTRACT CLAUSE

The invention disclosed herein was made or conceived in the course of or under a contract with the United States Government identified as No. DE-AC-0379E771305.

CROSS-REFERENCE TO RELATED APPLICATION

This application is related to U.S. Pat. Application Ser. No. 219,185 filed Dec. 22, 1980 in the name of A. O. Isenberg and entitled "Fuel Cell Generator", now abandoned, hereby incorporated by reference. The related application may be referred to for additional information on an exemplary fuel cell generator of the type for which the disclosed invention is applicable.

BACKGROUND OF THE INVENTION

1. Field of the Invention

This invention relates to solid electrolyte fuel cell generation systems, and more particularly provides a method for processing reactants for such systems.

2. Description of the Prior Art

High temperature solid electrolyte fuel cells convert, through a usually exothermic electrochemical reaction, chemical energy into direct current electrical energy, typically at temperatures above 700° C. The reaction takes place at the electrode-electrolyte interfaces where the electrolyte is sandwiched between an anode and a cathode. The reaction involves a relatively pure fuel, for example a mixture of hydrogen and carbon monoxide, and an oxidant such as oxygen or air. Where hydrogen and carbon monoxide fuel is utilized in a fuel cell based system, it is typically provided from a reformer, upstream of a fuel cell stack. The reformer reacts, for example, hydrocarbons, natural gas, or alcohols with steam in an endothermic process to produce a fuel suitable for the fuel cells, such as hydrogen and carbon monoxide mixtures.

The exothermic reaction in the fuel cells and heat released by other cell losses requires that a substantial cooling means be utilized. For example, relatively large amounts of cooling air are passed adjacent selected cell components. This may detract from overall system efficiency. Similarly, the endothermic reaction at the reformer requires substantial heat input, which also may detract from overall efficiency.

Many reformers operate with catalysts that are in limited supply, such as platinum. It is known that reformation can take place in that presence of less exotic materials, such as nickel. Also known is the use of cobalt for this purpose. Reformers upstream of the fuel cells have utilized particulated, or high surface area catalysts. Certain fuel cell configurations have been considered for so called indirect fuel cell systems. For example, FIG. 2.2 of a text entitled Fuel Cells For Public Utility And Industrial Power, Noyes Data Corp., 1977, and the accompanying description, refer to a molten carbonate electrolyte cell as a promising candidate for utilizing a hydrocarbon fuel reformed to hydrogen and CO at a nickel anode. The description also refers to an indirect solid-electrolyte fuel cell system wherein excess heat from the fuel cell system reaction at the cell is utilized as input to a coal gasification process. U.S. Pat. No. 3,462,306 also describes a liquid electrolyte fuel cell system having a nickel electrode which converts a mixture of methane ($CH_4$) and water vapor into carbon dioxide and hydrogen.

Technical problems have, however, prevented such contemplated designs from achieving a system which is workable in practice. Concerns are typically raised relating to materials compatability and stability, reactant and product transport to and from the fuel cells, and particularly overall system efficiency.

It is thus desirable to provide a method of operating a fuel cell based system which offers increased system efficiency and alleviates other deficiencies of existing designs.

SUMMARY OF THE INVENTION

This invention provides a method of operating a fuel cell based system, with in-situ reformation of a reactant gas, which achieves good system efficiency and lowers cell cooling requirements. In essence the preferred method symbiotically combines an exothermic electrochemical generation reaction and an endothermic reformation reaction. In preferred form a solid electrolyte so-called sealless fuel cell generator, of a type described more fully in the cross referenced application, includes a housing surrounding a plurality of chambers. A porous barrier separates a generator chamber and a preheating, combustion product chamber.

Elongated, annular fuel cells having an electrochemically active length within the generator chamber have an anode including a material which functions in part as a catalytic high temperature reformer for gaseous reactant mediums such as hydrocarbons, natural gas and alcohols. The cells also have an electrochemically inactive length which also provides reformation. The anode is preferably the outer electrode of tubular shaped fuel cells, and includes an outer surface of porous nickel or cobalt. Cobalt is particularly beneficial where the reformable medium contains sulphur compounds.

An oxidant, such as air, flows within the fuel cells, adjacent the cathode, and subsequently, in depleted form, into the combustion product chamber. The reformable gaseous reactant medium is mixed with steam, to form a mixture at a temperature in the range of 1200° F. The mixture is then fed to a plenum within the generator, and from the plenum through a distributor plate to the chamber containing the active length of the fuel cells, in a manner such that the mixture surrounds the outer surface of the anodes and the inactive length.

Some of the mixture is reformed along the inactive length and the mixture then diffuses to the anodes where it is catalyzed with the steam to, for example, hydrogen and CO. Oxygen is transported from the cathodes, through the solid electrolyte, also to the anodes, where it combines with the reaction products of the reformation reaction, such as hydrogen and carbon monoxide.

The excess reactants and chemical products of these reactions are ultimately transferred to the preheating combustion chamber, through the porous material, where they are combusted and function to preheat incoming oxidant.

BRIEF DESCRIPTION OF THE DRAWINGS

The advantages, nature and additional features of the invention will become more apparent from the following description, taken in connection with the accompanying drawing, in which.

DESCRIPTION OF THE PREFERRED EMBODIMENT

Figure 1:
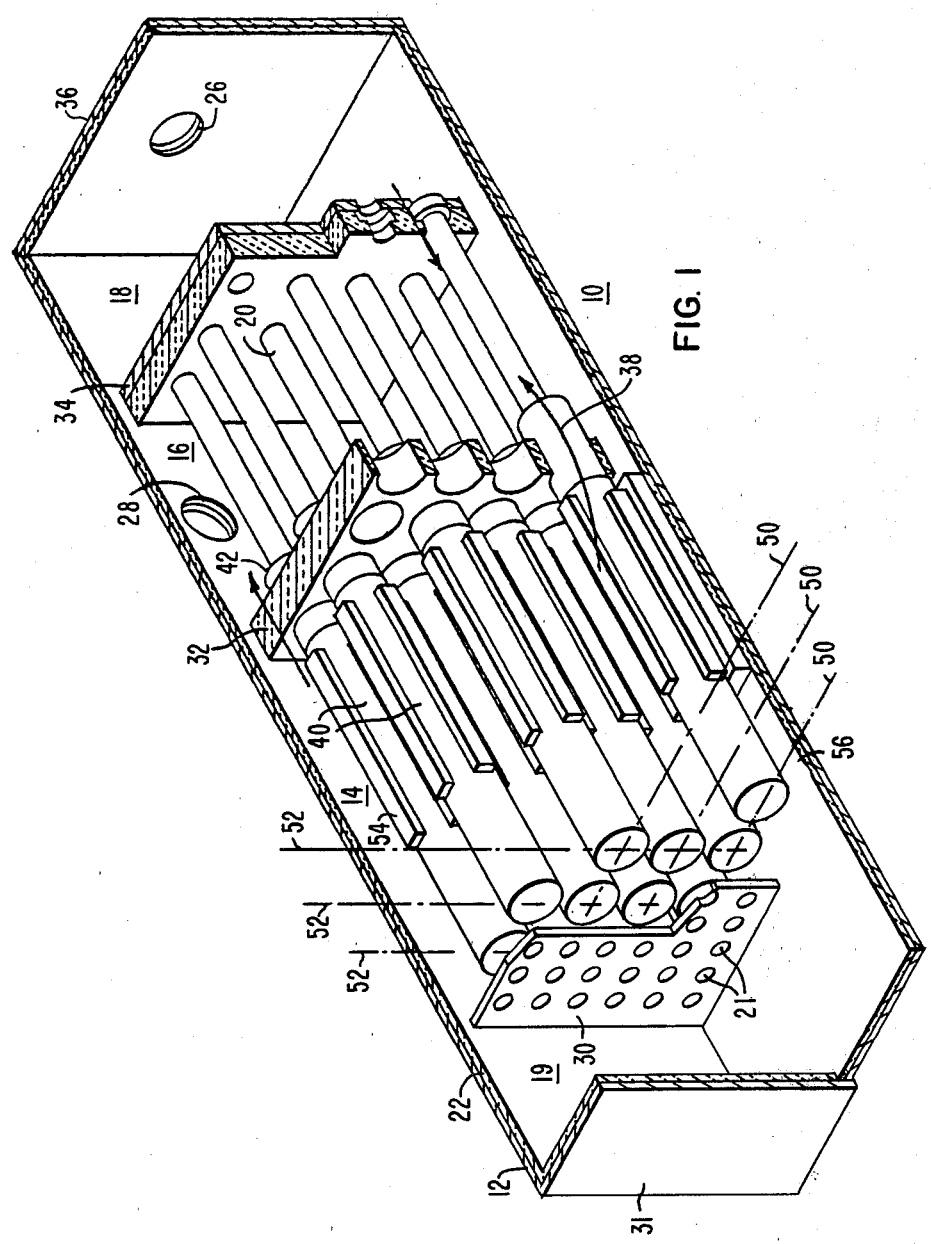
FIG. 1 is a broken perspective view of an exemplary fuel cell generator of the type to which the invention is applicable.
Figure 2:
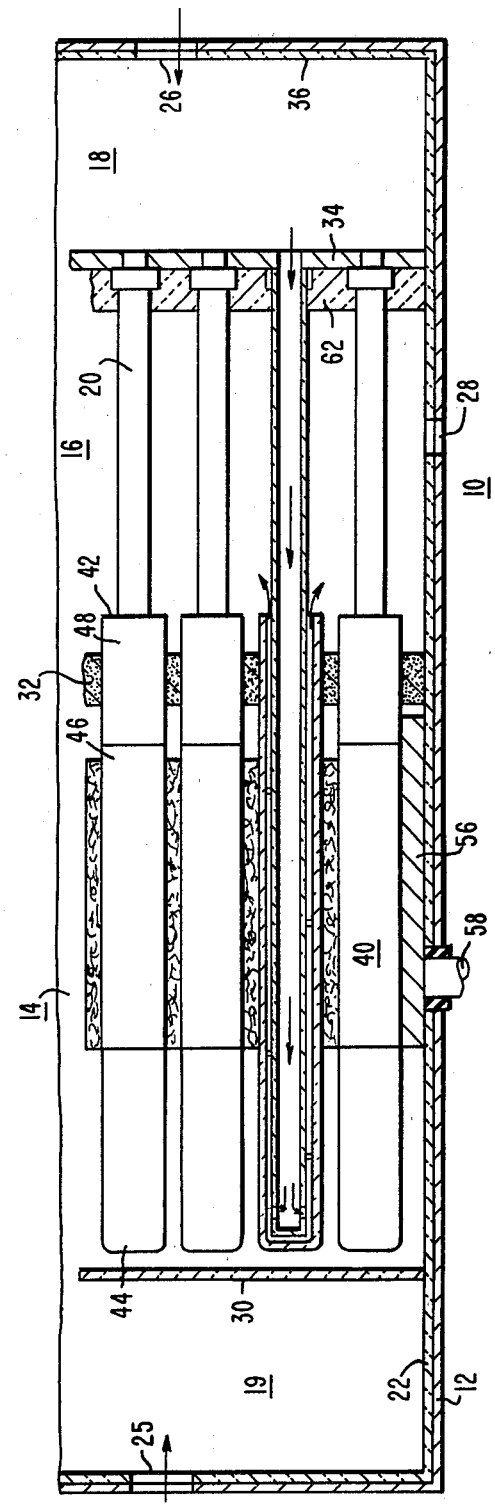
FIG. 2 is a view, partially in section, of the generator shown in FIG. 1.
Figure 3:
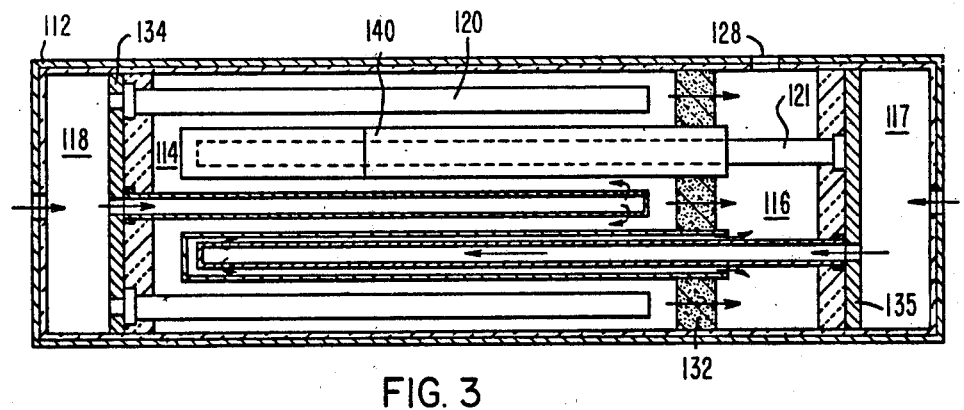
FIG. 3 is a view, partially in section, of another exemplary generator.

Referring now to FIGS. 1 through 3, there is shown a fuel cell generator 10 including a gas-tight housing 12. The housing 12 surrounds a plurality of chambers, including a generating chamber 14 and a combustion product or preheating chamber 16. Also provided is a reformable reactant mixing and distribution chamber 19. An oxidant inlet chamber 18 can also be contained within the housing 12. Alternatively, other means for manifolding an oxidant into conduits 20 can be utilized. The housing 12 is preferably comprised of steel, and lined throughout with a thermal insulation 22 such as low density alumina insulation. Penetrating the housing 12 and insulation 22 is a reformable medium inlet port 25, an air inlet port 26, and a combustion product outlet port 28, as well as ports for electrical leads.

The generating chamber 14 extends between a wall 30 of the housing 12 and a porous barrier 32. The preheating chamber 16 extends between the porous barrier 32 and a tube support structure such as a tube sheet 34. The oxidant inlet chamber 18 extends between the tube sheet 34 and an end wall 36 of the housing 12. The mixing and distribution chamber 19 extends between an end wall 31 and the wall 30. The wall 30 is porous to the reformable gaseous medium entering the chamber 19, and preferably includes perforations 21 which ensure a preselected distribution of the reformable gaseous medium into the generating chamber 14.

The dividing barriers can include various structural types, and additional support and flow baffles can be incorporated. The shown porous barrier 32 and the tube sheet 34 need not be sealed structures. The porous barrier 32, in particular, is designed to allow flow between the generating chamber 14, operating at an approximate pressure slightly above atmospheric, and the preheating chamber 16, operating at a slightly lower pressure, as indicated by arrow 38. While the generator 10 is shown in a horizonal orientation in FIG. 1, it can be operated in a vertical or other position.

High temperature, elongated, solid oxide electrolyte annular fuel cells 40 extend between the preheating chamber 16 and the generating chamber 14. The cells have open ends 42 in the preheating chamber 16, and closed ends at an inactive length 44 in the generating chamber 14. The fuel cells are preferably tubular, including a solid oxide electrolyte sandwiched between two electrodes, supported on a tubular porous support. Each cell includes an electrochemically active length 46 and an inactive length 48. Another electrochemically inactive length is at the closed end 44, and can extend a substantial portion of the entire length of the cells. The active length is contained within the generating chamber 14. The length 48 is electrochemically inactive. The inactive length 44 is comprised of a material which, at elevated temperatures, above approximately 500° C., has the capability to reform a gaseous medium to products such as hydrogen or carbon monoxide. Such products are the fuel for the electrochemical reaction at the active cells. The inactive length of the cell tubes, particularly length 44, may be fabricated bare of an underlying air electrode (cathode), or bare of an electrical contact to the cathode, yet it carries a dense electrolyte layer and the porous layer, representing the fuel electrode in the active cell area, on top of the electrolyte and thus in contact with the reformable gaseous medium.

Figure 5:
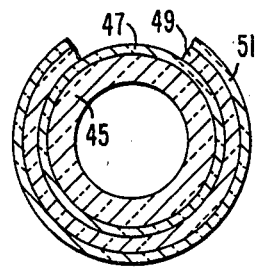
FIG. 5 is a cross-sectional view through an active length of a fuel cell.
Figure 6:
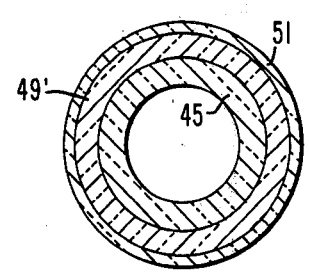
FIG. 6 is a cross-sectional view through an inactive length of a fuel cell.

FIG. 5 shows a cross section through the active length 46. Serially from the interior area radially outward, the cross section includes a porous tubular support 45, a porous electrode 47 such as a cathode, the solid electrolyte 49, and a second porous electrode 51 such as the anode. Similarly, FIG. 6 shows a cross section through the inactive length 44. Serially from the interior area radially outward, the cross section includes the porous insulator support 45, the solid electrolyte 49', and the second porous electrode 51. Here the solid electrolyte 49' has replaced the volume occupied by the porous electrode 47 and the electrolyte 49 in the active length. The broken area shown in FIG. 5 is the location where series electrical interconnection to an adjacent cell can be made.

Each individual cell generates approximately one volt, and a plurality are electrically interconnected, preferably in a series-parallel rectangular array. For descriptive purposes, the arrangement can be described as including rows 50 and columns 52. Each cell in a row 50 is electrically connected along its active length 46 to the next adjacent cell, preferably through direct contact of their outer peripheries. For the preferred configuration shown in FIG. 1, where the reformable medium flows about each cell and an oxidant, such as air, flows within each cell, the anode is the outer electrode of each cell and the cathode is on the inside. Thus, cell-to-cell contact within a row is in parallel, among adjacent anodes.

Each cell in a column 52 is electrically interconnected in series to the next adjacent cell 40. In the preferred configuration, this interconnection is made from the inner cathode of one cell to the outer anode of the next consecutive cell, through an interconnect 54.

In the configuration shown in FIGS. 1 and 2, the anode is the outer electrode and the cathode is the inner electrode. In the configuration shown in FIG. 3, discussed more fully hereinafter, the cathode is the outer electrode and the anode is the inner electrode. In the configuration of FIGS. 1 and 2, the anode, or a porous surface surrounding the anode, is comprised, similar to the inactive length, of a material which, at elevated operating temperatures, is capable of catalytically reforming a gaseous medium to a fuel for the cells, such as hydrogen or carbon monoxide. Preferred materials are nickel, nickel containing compounds, cobalt and cobalt containing compounds. Other catalytic materials can also be utilized.

The direct current electrical energy generated by the cells is preferably collected by a first current collector, such as a conductive metal plate 56 or felt pad, positioned in electrical contact with each cell 40 in the first row 50, and a similar second collector (not shown), positioned in contact with the last row. Electrical leads 58 are accordingly provided to the current collectors.

The conduits 20 are preferably loosely supported at one end in the tube sheet 34. The tube sheet 34 is preferably stainless steel, with bores that fit loosely about the conduits 20 to allow free thermal expansion. The conduits 20 are preferably comprised of alumina, and the tube sheet is covered with an insulation 62 such as low density alumina. Oxidant may leak across the tube sheet 34.

The conduits 20 extend from the tube sheet 34 into the open end 42 of the fuel cells 40, a single conduit 20 corresponding to a single fuel cell. Each conduit 20 extends to the active length 46 of the fuel cell, and preferably close to the closed end of the cell. Each conduit is provided with a means for discharging a reactant medium into the fuel cell 40.

The porous barrier 32, which allows a throughput of depleted fuel, is preferably a porous ceramic baffle, such as one comprised of fibrous alumina felt, or ceramic plate segments with porous inserts such as ceramic wool plugs, surrounding each fuel cell 40.

During operation an oxidant such as air enters the inlet chamber 18 through inlet port 26. The chamber 18 functions as an inlet manifold for the individual conduits 20. Air enters the conduits at a temperature of approximately 500°-700° C., and a pressure above atmospheric, being initially heated prior to entering the housing by conventional means. The air flows within the conduits, through the preheating chamber 16, where it is further heated to a temperature of approximately 900° C. The air flows through the length of the conduit, being further heated to approximately 1000° C., and is discharged into the fuel cell 40. The air within the fuel cell electrochemically reacts at the fuel cell cathode along the active length 46, depleting somewhat in oxygen content as it approaches the open end 42 of the cell. The depleted air is discharged into the combustion product or preheating chamber 16.

Figure 4:
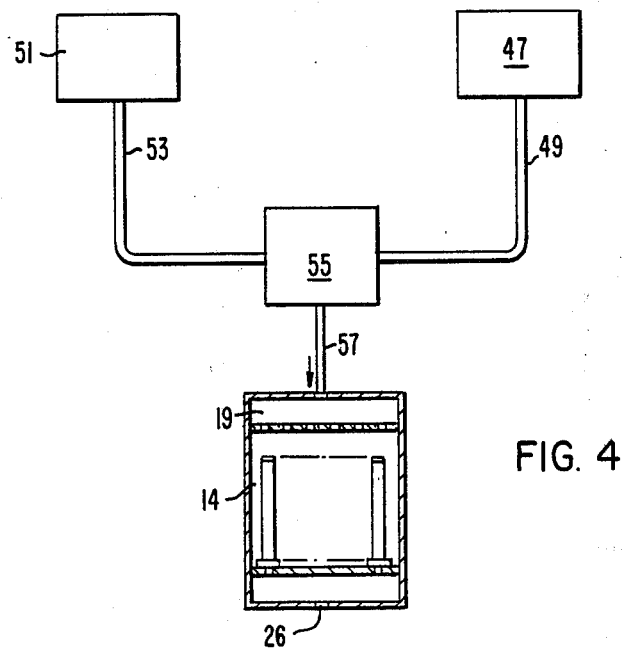
FIG. 4 is a block diagram schematically illustrating one reactant feed method in accordance with the invention.

As shown schematically in FIG. 4, there is provided means for providing a medium reformable to a fuel useful to the electrochemical reaction at the fuel cells, such as a container 47 and conduit 49. Additionally utilized are means for providing another reactant useful in a reformation process, such as steam, including a heater 51 and conduit 53. The reformable medium is preferably gaseous, and can include hydrocarbons such as methane ($CH_4$), alcohols such as ethyl alcohol ($C_2H_4OH$), and compositions such as natural gas. The steam and reformable medium are integrated in means for mixing such as mixer 55, and flow through a conduit 57 to the distribution chamber 19. The steam and reformable medium are preferably heated to a temperature of approximately 1200° F. prior to entering the distribution chamber 19.

From chamber 19 the steam-reformable medium mixture flows through wall 30 into the generating chamber 14 and about the fuel cells. The mixture first contacts the inactive length 44 of the cells, and reformation of part of the mixture to a useable fuel occurs. The fuel, other reformation products and the reformable mixture flow to the active length, where further reformation takes place, as does the electrochemical power generation reaction.

The mediums diffuse to the anode surface adjacent the electrolyte, a portion being catalyzed with steam to $H_2$ and CO. Also at the anode surface, oxygen has been transported across the cell electrolyte to the anodes, where it combines with most of the reformed products $H_2$ and CO. It may also combine directly with some of the unreformed medium, such as methane, which is present at the anode. The combustion products arising from the oxygen reaction, $2H_2+O_2=2H_2O$; $2CO+O_2=CO$; $CH_4+2O_2=CO_2+2H_2O$, diffuse into the generating chamber between the fuel electrodes where they are transported to the exhaust end of the generating chamber. There they are exhausted along with unreacted $H_2$, CO and trace $CH_4$, present at the exhaust end, through the porous barrier 32 and into the combustion product chamber 16. The porous barrier with a slight pressure drop across it preferably precludes oxygen from the air exhaust backflowing into the generating chamber. Similarly, the air, functioning as both a process reactant and a cooling medium, enters the oxidant inlet chamber 18, enters the conduits 20 and flows into the cells where oxygen from the air is picked up by the air electrode (cathode) and is transferred to the electrolyte. The air exhaust, partially depleted of $O_2$, exhausts through the porous barrier and enters the combustion zone, where it combusts with $H_2$, CO, and $CH_4$ present in the fuel exhaust, further preheating the air flowing through the conduits 20.

An exemplary system is based upon the following parameters: a methane feed rate for 600 millivolts, 400 amps per ft$^2$, for an electrode area of 30 cm.$\times \pi \times$1.5 cm$=0.13$ ft$^2$, and for an electrical output of 11,852 Btu per lb of $CH_4$, is $0.91 \times 10^{-2}$ lb per hr. For the flow rate of $0.91 \times 10^{-2}$ lb per hr. of methane, a mean velocity of 0.01 ft per sec (43 ft per hr.) is attained in an approximately $\frac{1}{8}''$ annulus of the fuel-cell anode, and the ReSc number is 0.12. The tube length for 99.9% conversion of methane would be less than 1.0" of a 12" fuel cell tube. This is based on the following mass transfer calculation, I and II.

I. Laminar convection coefficients for fully established flow in a tube are given by St$=3.65$/Re Sc
St(mass transfer Stanton number)$=$h/u
Re(Reynolds number)$=$u D/$\upsilon$
Sc(Schmidt number)$=\upsilon/D_{12}$
h(mass transfer convection coefficient, ft/sec.)
u(mean flow velocity in tube, ft/sec.)
D(tube diameter, ft); $D_{12}$ (diffusion constant, ft$^2$/sec)
$\upsilon$(kinematic viscosity, ft$^2$/sec.)

The Stanton number correlation applies to fully developed flow in tubes; since the Stanton number is higher in the entrance region of a tube, the use of 3.65/ReSc is conservative and implies an upper bound to the calculation of the tube length required for 100% reforming of $CH_4$ to $H_2$+CO.

Analyzing methane concentration (cross-sectional mean value, $\rho$, lb per ft$^3$) along the length of a tube within which a reforming reaction is taking place, it is found that if all the methane reaching the wall is catalyzed to $H_2$ and CO, the mean methane concentration over any cross-section along the length of the tube can be determined to be $$\rho(CH_4 \text{ at } x) = \rho_o(CH_4 \text{ at } x = o) \exp\left\{ \frac{4h}{Du} x \right\}.$$

The ReSc numbers can be evaluated from uD/$D_{12}$, where $D_{12}$ is the diffusion coefficient of methane in steam. (This follows from uD/$\upsilon \times \upsilon/D_{12}$). Estimates of $D_{12}$, obtained from standard procedures are $0.23 \times 10^{-2}$ ft² per sec. The value of x at $\rho/\rho_o = 0.001$, is less than 1".

II. The following data apply to an exemplary commercial natural-gas/steam reformer using steam-hydrocarbon reforming catalyst.

| Type of Plant, | Syn gas |
|---|---|
| Feedstock, | Natural gas |
| Catalyst Volume, | ~200 ft³ |
| Catalyst Size, | ¾ × ¾ rings (inches) |
| No. Tubes, | ~48 |
| Tube I.D. | 5" |

Data relating primary reformer space velocities to tube diameter are available from known reformer data. A 5" tube has a space velocity of 1200 SCFH₂ per hr ft³ of catalyst volume, and the ¾"×¾" rings have an estimated surface area per unit volume of 74 ft²/ft³, and this converts the space velocity to 16.2 SCFH₂ per hr ft² of catalyst area. The fuel electrode area of a fuel cell is about 0.13 ft²; thus the convected space velocity applied to this area would produce $10^{-2}$ lb H₂ per hr. The methane feed to the exemplary fuel cell will produce only $0.3 \times 10^{-2}$ lb of H₂ per hr., so the wall catalysis is three times greater than needed. Thus, the ability of the exposed catalytic surface along the active length of the fuel cells to reform methane is three times greater than the feed rate of methane.

Similarly, an alcohol based system can be utilized. For example, ethyl alcohol and steam will reform at a nickel or cobalt surface generally according to $C_2H_4OH + H_2O \rightarrow 2CO + 3\tfrac{1}{2}H_2$. This reaction will require an amount of steam in excess of the stoichiometric amount to ensure that coking does not occur.

It will now be apparent that similar processes can be carried out with the system configuration of FIG. 3. In either configuration, the combustion product preheating chamber 16 serves to preheat the reactants, through combustion as well as sensible heat, and thus assist the endothermic reforming reaction. The cells and catalytic reformable surfaces are further heated by the exothermic electrochemical reaction occurring across the electrolyte.

Referring now to FIG. 3, the fuel anode is on the inside of the annular fuel cells and the oxidant cathode is on the outside. The controlled leakage or seal-less arrangement described above is utilized. In FIG. 3, four primary chambers are shown within the insulated sealed housing 112, including an oxidant inlet chamber 118, a generating chamber 114, a combustion product chamber 116, and a reformable medium manifold inlet and distribution chamber 117.

Oxidant preheating conduits 120 are mounted in a tube sheet 134, and fuel preheating conduits 121 are mounted in a second tube sheet 135. The mountings, including insulation, can be similar to that described with reference to FIGS. 1 and 2, allowing thermal expansion and leakage. The fuel conduits 121 extend into annular fuel cells 140, and the air conduits 120 are interspersed among the cells. The air conduits 121 can be arranged as rows interspersed among selected groupings of cells, for example, three columns of cells can be interconnected in series-parallel as previously described, and electrically segregated from another grouping of three columns by a column of air conduits. In this case, peripheral electrical collector plates would be associated with each grouping of three columns. Alternatively, the cells can be interconnected among one another, with air conduits placed about the periphery of the entire set of interconnected cells. Additionally, if the cells are of large diameter relative to the diameter of the air conduits, the air conduits can be positioned in the gap between a grouping of, for example, four cells in a square array.

During operation, preheated oxidant, such as air, enters the oxidant inlet chamber 118, and is manifolded to the conduits 120. The air traverses the conduits 120, being further preheated, and is discharged into generating chamber 114, where it flows about the fuel cells 140 and the electrochemical reaction takes place. The cells include an active length. Depleted air then flows through a porous barrier 132 and into the combustion product chamber 116, for direct combustion with depleted fuel. A feedback duct interconnecting the higher pressure generating chamber 114 and the lower pressure combustion chamber 116 can also be utilized.

Preheated reformable medium enters inlet chamber 117 and flows through conduits 121, being further preheated. The medium is then discharged into the fuel cells 140 and flows in the reverse direction, being reformed to a fuel usable in the subsequent electrochemical reaction. Depleted fuel along with remaining products, such as unreformed gaseous medium, is then discharged into the combustion product chamber 116. In the combustion product chamber 116, the depleted fuel, depleted oxidant, reformable medium which may flow through the tube sheet 135, oxidant which may flow through the barrier 132, and other products such as excess water vapor, directly react to combust and generate heat. The heat of this reaction, along with the sensible heat contained in the depleted products, preheat the reformable medium entering through conduits 121. Excess energy discharged with the combustion products through outlet 128 can be advantageously utilized downstream of the generator.

The described exemplary reformation-generation systems have a reformer heat absorption of about 6000 Btu's per lb of, for example, methane fed to the generator. If an external reformer design is used and the 6000 Btu's is usually supplied by combustion of the anode exhaust gas, about 20–25% of the fuel value fed to the fuel cell is used to reform the gas to H₂ and CO. In the integrated fuel cell/reformer design the 6000 Btu's are supplied by the heat generated in the fuel cell, so that substantially all of the reformed gas, as much as 95% or more, can be used to generate electricity. Thus, the system electrical efficiency will be increased in the range of 25%. In addition, the 6000 Btu reforming reaction will reduce the cathode cooling air used by about 40%.

Since numerous changes may be made in the above-described arrangement without departing from the spirit and scope thereof, it is intended that all matter contained in the foregoing be interpreted as illustrative, and not in a limiting sense.

We claim:

1. A method of operating a fuel cell generator of the type having a plurality of interconnected, elongated, annular solid oxide fuel cells each including a porous anode and cathode wherein said anode of each said cell includes a catalytic material, said method comprising:
   flowing an oxidant adjacent said cathode; and
   flowing a reactant, reformable to at least one of hydrogen and carbon monoxide in the presence of said catalytic material, adjacent said anode.

2. The method of claim 1 wherein said step of flowing a reactant comprises flowing at least one of a hydrocarbon, an alcohol and natural gas adjacent said anode.

3. A method of operating a fuel cell generator of the type having a plurality of interconnected, elongated, annular solid oxide fuel cells each including a porous anode and cathode wherein said anode of each said cell includes at least one of nickel and cobalt, said method comprising:
   flowing an oxidant adjacent said cathode; and
   flowing a reactant, reformable to at least one of hydrogen and carbon monoxide in the presence of at least one of nickel and cobalt, adjacent said anode.

4. The method of claim 3 wherein said step of flowing a reactant comprises flowing a hydrocarbon adjacent said anode.

5. The method of claim 4 wherein said step of flowing a hydrocarbon comprises flowing methane adjacent said anode.

6. The method of claim 3 wherein said anode includes cobalt and said step of flowing a reactant comprises flowing a sulphur containing reformable reactant adjacent said anode.

7. An improved method of operating a fuel cell generator of the type having:
   a housing surrounding a plurality of chambers including a generator chamber and a combustion product chamber;
   a porous barrier separating said generator and combustion product chambers;
   a plurality of elongated annular fuel cells, each having an electrochemically active length disposed within said generating chamber, said length having a porous outer surface comprised of at least one of nickel and cobalt;
   means for flowing a first gaseous reactant throughout said annular fuel cells and through said porous barrier into said combustion product chamber;
   means for flowing a second gaseous reactant into said generator chamber, about said fuel cells, and through said porous barrier into said combustion product chamber; and
   means for segregating said first and second gaseous reactants from direct contact with one another prior to entry of each into said combustion product chamber;
   wherein the improvement comprises mixing a medium reformable to at least one of hydrogen and carbon monoxide with steam, and flowing the mixture through said means for flowing a second gaseous reactant.

8. A high temperature solid electrolyte fuel cell generator, comprising:
   a housing surrounding a plurality of chambers including a generator chamber and a combustion product chamber;
   a porous barrier separating said generator and combustion product chambers;
   a plurality of elongated annular fuel cells, each having an electrochemically active length disposed within said generating chamber, said active length having a porous outer surface comprised of at least one of nickel and cobalt, said cells further having an inactive length having an outer porous surface comprised of at least one of nickel and cobalt;
   means for flowing a first gaseous reactant throughout said annular fuel cells and through said porous barrier into said combustion product chamber;
   means for flowing a reformable gaseous medium into said generator chamber, about said inactive length and then about said active length of said fuel cells, and through said porous barrier into said combustion product chamber; and
   means for segregating said first gaseous reactant and said reformable gaseous medium from direct contact with one another prior to entry of each into said combustion product chamber.

9. The generator of claim 8 wherein said inactive length is an integral extension of each said cell without a cathode along said extension.

10. The generator of claim 8 wherein said electrochemically active length serially includes, from a central area radially outward, a porous tubular support, a porous electrode, a solid electrolyte, and a second porous electrode, and wherein said inactive length serially includes, from a central area radially outward, said porous tubular support, said solid electrolyte and said second porous electrode.

11. A method of operating a high temperature solid electrolyte fuel cell generator having:
   a housing surrounding a plurality of chambers including a generator chamber and a combustion product chamber,
   a porous barrier separating said generator and combustion product chambers,
   a plurality of elongated annular fuel cells, each having an electrochemically active length disposed within said generating chamber and including an interior porous anode comprised of at least one of nickel and cobalt,
   means for flowing a medium reformable to at least one of hydrogen and carbon monoxide throughout said annular fuel cells, adjacent said anode, and through said porous barrier into said combustion product chamber,
   means for flowing a gaseous oxidant into said generator chamber, about said fuel cells, and through said porous barrier into said combustion product chamber, and
   means for segregating said reformable medium and oxidant from direct contact with one another prior to entry of each into said combustion product chamber,
   said method comprising:
   mixing steam and a medium reformable to at least one of hydrogen and carbon monoxide to form a mixture at a temperature above 700° C.; and then flowing said mixture to said means for flowing a medium throughout said fuel cells.

12. A high temperature solid electrolyte fuel cell generator, comprising:
   a housing surrounding a plurality of chambers including a generator chamber and a combustion product chamber;
   a porous barrier separating said generator and combustion product chambers;
   a plurality of elongated annular fuel cells, each having an electrochemically active length disposed within said generating chamber, said active length having a portion serially including, from a central area radially outward, a porous tubular support, a porous electrode, a solid electrolyte, and a second porous electrode, said second porous electrode including a catalytic material, said cells further having an inactive length, said inactive length serially including, from a central area radially outward, said porous tubular support, said solid electrolyte and said second porous electrode;

means for flowing a first gaseous reactant throughout said annular fuel cells and through said porous barrier into said combustion product chamber;

means for flowing a reformable gaseous medium into said generator chamber, about said inactive length and then about said active length of said fuel cells, and through said porous barrier into said combustion product chamber; and means for segregating said first gaseous reactant and said reformable gaseous medium from direct contact with one another prior to entry of each into said combustion product chamber.

13. The method in accordance with claim 7 wherein said means for flowing a second gaseous reactant comprises:
   a distribution chamber disposed within said housing and adjacent to said generating chamber;
   a porous barrier separating said distribution and generating chambers; and
   an inletting means for inletting a second gaseous reactant into said distribution chamber.

14. The generator in accordance with claim 8 wherein said means for flowing a reformable gaseous medium comprises:
   a distribution chamber disposed within said housing and adjacent to said generating chamber;
   a porous barrier separating said distribution and generating chambers; and
   an inletting means for inletting a reformable gaseous medium into said distribution chamber.

15. The method in accordance with claim 11 wherein said means for flowing a medium reformable to at least one of hydrogen and carbon dioxide comprises:
   a distribution chamber disposed within said housing and adjacent to said generating chamber;
   a porous barrier separating said distribution and generating chambers; and
   an inletting means for inletting a medium reformable to at least one of hydrogen and carbon dioxide into said distribution chamber.

16. The generator in accordance with claim 12 wherein said means for flowing a reformable gaseous medium comprises:
   a distribution chamber disposed within said housing and adjacent to said generating chamber;
   a porous barrier separating said distribution and generating chambers; and
   an inletting means for inletting a reformable gaseous medium into said distribution chamber.

* * * * *